United States Patent Office 3,223,228
Patented Dec. 14, 1965

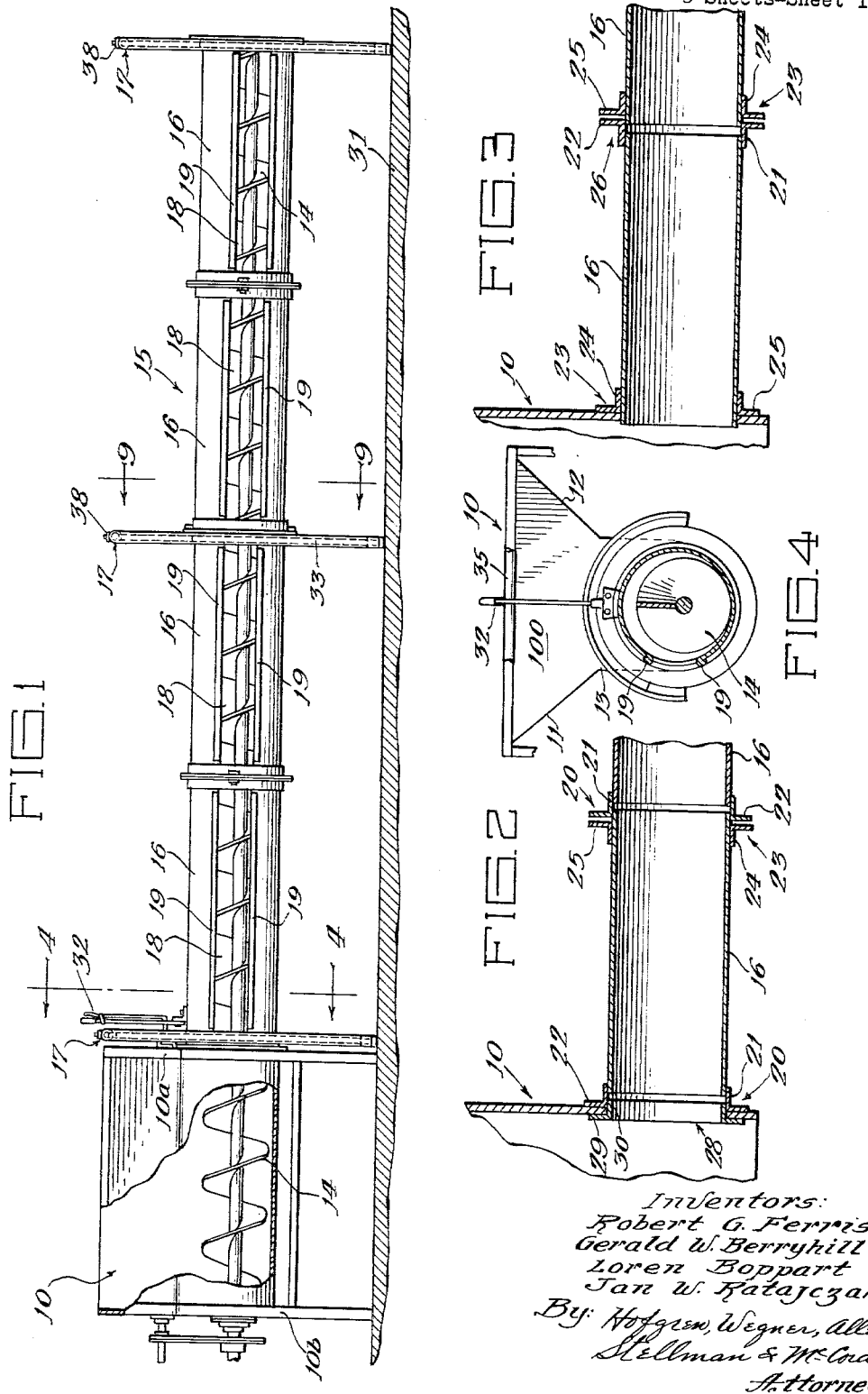

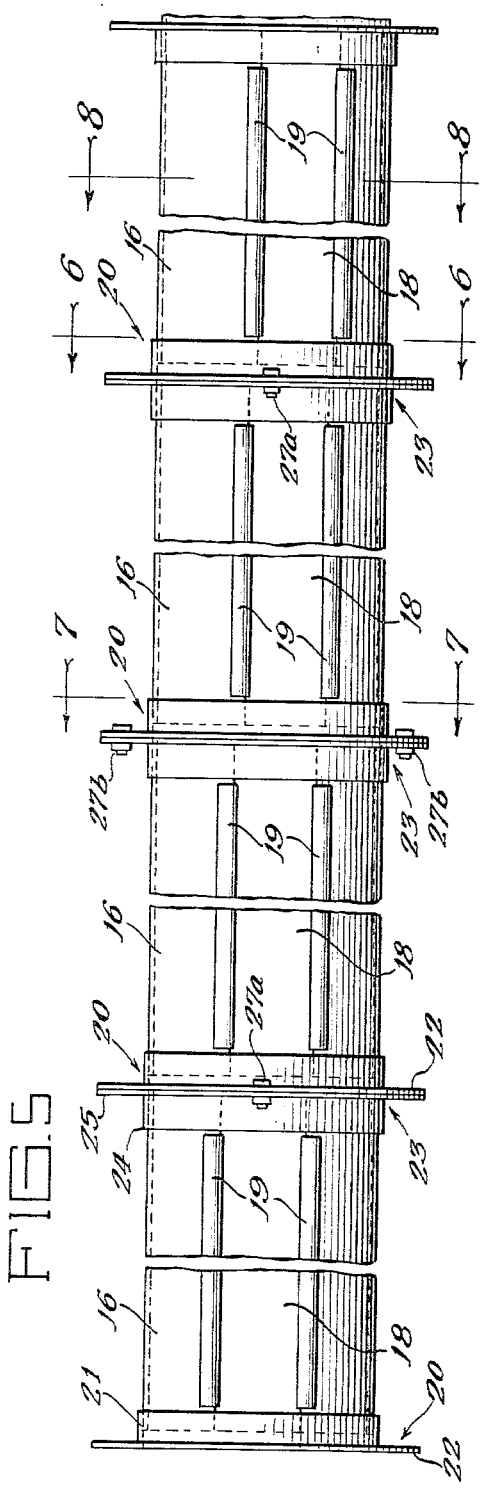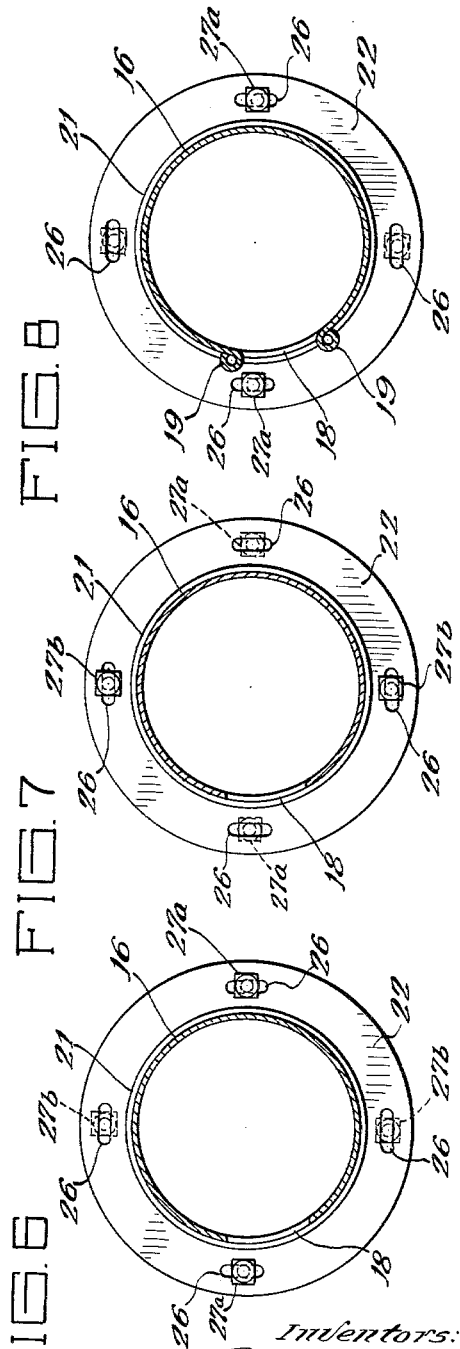

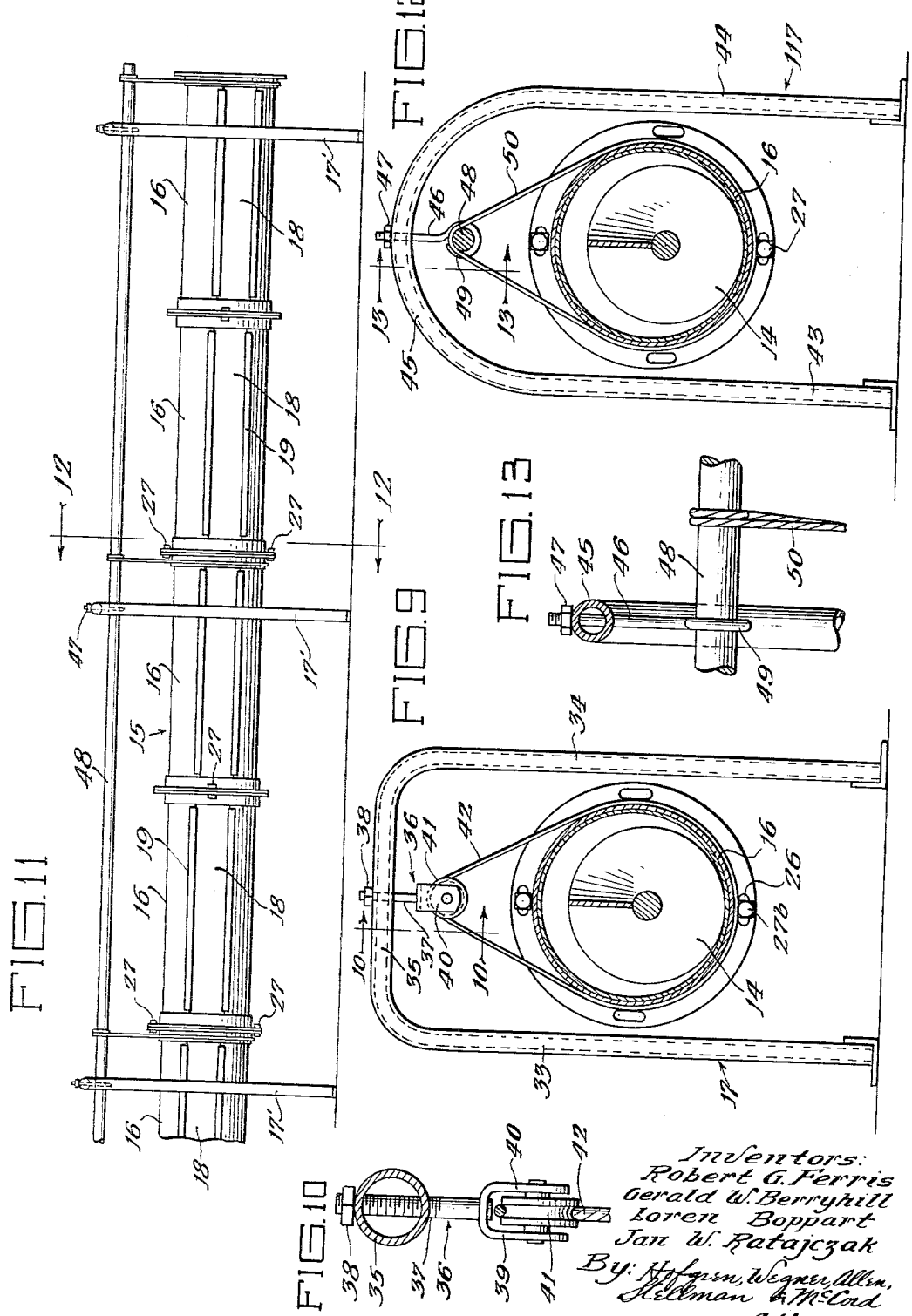

1

3,223,228
ANIMAL FEEDER
Robert G. Ferris, Gerald W. Berryhill, Loren Boppart, and Jan W. Ratajczak, Harvard, Ill., assignors to Starline, Inc., a corporation of Illinois
Filed Mar. 6, 1963, Ser. No. 263,309
7 Claims. (Cl. 198—204)

This invention relates in general to animal feeders, and more particularly to improvements in conveyor type animal feeders which are used to distribute particulate material, such as forage and the like.

In the animal feeder field, it has been the conventional practice to provide a feed storing hopper in combination with an elongated tubular conveyor having a plurality of openings positioned at spaced apart points therealong. Conventionally, an auger has been positioned within said tubular member and extends into said hopper to translate material from said hopper, along said member, and out through said openings. Such arrangements are typified by those shown in U.S. Patent No. 2,867,314 to C. W. Hansen and U.S. Patent No. 3,059,759 to D. C. Heitshu. With the present trend toward larger farms, the users of such devices have had to feed a great number of animals at one time. To accommodate a large number of animals, it has not been unusual for the length of a tubular conveyor to extend over one hundred feet. It is often desired to rotate the tubular conveyor as a unit, either to discharge accumulated feed therefrom, or to prevent rain and snow from entering the conveyor. Difficulty has been experienced in rotating tubular conveyors of great length because of the relatively rigid mountings of the conveyors with their supports, and also because of the sag of the conveyors between their supports due to manufacturing variances. An additional feature which contributes to the difficulty in rotation of known tubular conveyors is that the ground upon which the feed bunk rests may be uneven; and since the conveyor follows the pattern of the ground it may not be a true cylinder throughout its length.

The general purpose of the present invention is therefore to provide an elongated tubular conveyor which is capable of being rotated in a substantially effortless manner.

An object of the present invention is the provision of a tubular conveyor which is suspended by cables from a supporting structure.

Another object of the invention is to provide an elongated tubular conveyor with a plurality of sections which are capable of flexure relative to one another during rotation.

Still another object of the invention is to provide an elongated tubular conveyor which has a substantially straight axis in spite of uneveness in the ground over which it is mounted.

A still further object of the invention is the provision of an elongated conveyor which will compensate for misalignment in installation and imperfections in fabrication.

These and other objects of the invention will become more fully apparent from the specification and drawings wherein:

FIGURE 1 is a front elevational view of a preferred embodiment of the invention;

FIGURE 2 is a fragmentary longitudinal central sectional view on an enlarged scale showing the conveyor tube and hopper with the auger removed and the conveyor tube in a first position;

FIGURE 3 is a view similar to FIGURE 2, but showing the section adjacent the hopper in a reversed position;

FIGURE 4 is a sectional view taken substantially as indicated along the line 4—4 of FIGURE 1;

FIGURE 5 is an enlarged view of the conveyor illustrated in FIGURE 1 with certain parts broken away for clarity;

FIGURE 6 is a sectional view taken substantially as indicated along the line 6—6 of FIGURE 5;

FIGURE 7 is a sectional view taken substantially as indicated along the line 7—7 of FIGURE 5;

FIGURE 8 is a sectional view taken substantially as indicated along the line 8—8 of FIGURE 5;

FIGURE 9 is a sectional view on an enlarged scale taken substantially as indicated along the line 9—9 of FIGURE 1, showing a preferred embodiment of the support structure;

FIGURE 10 is a sectional view on an enlarged scale taken substantially as indicated along the line 10—10 of FIGURE 9;

FIGURE 11 is a front elevational view, similar to FIGURE 1, showing an alternative support structure;

FIGURE 12 is a sectional view on an enlarged scale, taken substantially as indicated along the line 12—12 of FIGURE 11; and FIGURE 13 is a fragmentary sectional view on an enlarged scale, taken substantially as indicated along the line 13—13 of FIGURE 12.

Referring now to the drawings, wherein like reference characters designate like or corresponding parts throughout the several views, reference numeral 10 is used in FIGURE 1 to indicate the feed hopper in its entirety. Hopper 10 is formed of conventional construction and includes front and rear walls 10a and 10b, respectively, and downwardly converging side walls 11 and 12, which define a relatively wide open mouth to receive feed. Side walls 11 and 12 form at their lower ends a hopper portion 13 of relatively narrow width, which is adapted to accommodate an auger 14 of a conveyor 15. It should be understood that the hopper end of auger 14 is suitably journalled in the hopper rear wall 10b, and that the outwardly extending end of the auger shaft is connected to a source of power, not shown, as is well known in the art.

Conveyor 15 extends forwardly from hopper 10, and includes a plurality of identical individual sections 16. Each section 16 is tubular in form, and when the sections are assembled into the conveyor 15, they are positioned in axially aligned end-to-end communicating relation. A plurality of standards 17 is positioned at spaced apart points along conveyor 15, and provide means for supporting the conveyor.

Each section 16 is provided with a slot 18 of uniform width which extends from end-to-end of the section. The margins of each slot 18 are provided with rolled over beads 19 which facilitate a flow of feed through the slots and eliminates sharp edges.

Each section 16 is provided with a female coupling at one end and a male coupling at the other end to facilitate the end for end reversal of the conveyor should any section become worn. A female coupling 20 includes a sleeve portion 21 secured to the outer diameter of section 16 by any conventional means, such as riveting, welding, or the like. Sleeve portion 21 is positioned to project longitudinally beyond the end of section 16, and is provided with a radial flange 22. A male coupling 23 is substantially identical to female coupling 20 in that it is provided with a sleeve portion 24 and a radial flange 25; however, the male coupling 23 is positioned inwardly from the outer end of section 16 to expose the outer end portion of the tubular member 16. It will be understood that the exposed outer end of a section 16 at the male coupling is slidably received within the projecting portion of the sleeve 21 at the female coupling on end adjacent section 16. This provides an overlapping connection between the sections which effectively prevents feed from leaking out between the sections.

Female coupling 20 and male coupling 23 are positioned on section 16 in such a manner as to allow flanges 22 and 25 to be located in abutting relation. Flanges 22 and 25 are each provided with a plurality of non-radial slots 26, four being illustrated in the preferred embodiment, positioned at diametrically opposed points on the flanges. Slots 26 on adjacent flanges are positioned in substantial alignment, and are adapted to receive therethrough connective members 27a and 27b, which may be bolts or the like. The shank of each connective member 27a or 27b is smaller than the length of slot 26, so that the connective member 27 may be loosened, and adjacent section 16 adjusted with respect to one another. This enables the elevation of slots 18 in adjacent sections 16 to be adjusted as desired. The male and female coupling arrangement is important in this respect because it provides an overlapping connection between adjacent sections 16, which allows them to be adjusted without danger of separation.

The means by which sections 16 are capable of flexing relative to one another are set forth most clearly in FIGURES 5-8. There it will be noted that instead of providing four connective members for each pair of connected flanges, two connective members are used at diametrically opposed points on the flanges. It will also be noted that the connective members 27a and 27b on successive connected flanges are positioned at substantially right angles to each other. For example, in FIGURE 6 and FIGURE 8, connective members 27a are located in a horizontal plane, and in FIGURE 7, the connective members 27b are positioned in a vertical plane. Flanges 22 and 25 are formed from a relatively thin gauge material, and possess an inherent amount of flexibility within the distortional limits of the material. By positioning the connective members on alternate pairs of flanges in planes at right angles to each other, the conveyor is capable of a limited amount of flexure.

Referring now to FIGURE 3, it will be noted that when the conveyor section adjacent hopper 10 is positioned with its male coupling adjacent the front wall 10a of the hopper, a neat communicating relationship is established between the interior of hopper 10 and the first conveyor section 16. However, as is shown in FIGURE 2, when the female coupling end of the first conveyor section 16 is placed against the front wall 10a of the hopper, it is necessary to provide an adapter 28 to make the communicating connection. Adapter 28 includes a radial fastening flange 29 which abuts the inner face of hopper wall 10a, and sleeve portion 30 which is substantially the same diameter as conveyor section 16 and extends outwardly from the hopper front wall to provide a male coupling means internally engaging the female coupling 20. Thus, the conveyor section 16 adjacent hopper 10 may be readily reversed by the mere inclusion of adapter 28 within the front wall of the housing 10. In either conveyor position the female coupling flange 22 is retained between the hopper wall 10a and a set of retaining rollers, not shown, as is well known in the art, so that the conveyor may be rotated.

As is best seen in FIGURE 9, standard 17 is a U-shaped member having leg portions 33 and 34, and a bight portion 35 that has a central opening. Suspended in the opening is a hanger assembly 36 in the form of a threaded adjusting stud 37 impaling the opening, a nut 38 for adjusting the hanger assembly within the standard 17, and a bifurcated lower end on the stud with arms 39 and 40 between which a sheave 41 is rotatably mounted. A cable 42 is trained over sheave 41 and is looped under a section 16 to provide support therefor.

A second form of supporting structure is illustrated in FIGURES 11-13, and includes a plurality of spaced apart standards 117 which are U-shaped in cross section and include leg portions 43 and 44 joined by a bight portion 45 having a central opening. The threaded shank of an eye bolt 46 impales the central opening, and a nut 47 adjustably secures the eye bolt 46 to standard 117 to provide means for adjusting the height of conveyor 15 within the standards 117. A continuous rod 48 is carried by the several eye bolts 46 on the standards 117 and extends from one end of conveyor 15 to the other; and cables 50 are double looped around the rod 48 at spaced points, preferably adjacent the ends of section 16 so as not to block openings 18, and looped under the sections 16 in a supporting manner.

To rotate the conveyor 15, the operator merely grasps the lever 32, which is removably mounted on the section 16 adjacent hopper 10, and swings it the desired amount. It can be readily understood that the swinging movement of lever 32 is accomplished substantially effortlessly, because the only friction that must be overcome in the embodiment illustrated in FIGURE 9, is the friction of sheave 41 within its supports, and in the embodiment illustrated in FIGURE 12, the friction of the rod 48 in the eyes 46. In addition, because the connective means on alternate pairs of flanges are positioned at right angles to each other, the conveyor 15 may flex during rotation, which will compensate for any non-alignment of the conveyor sections 16, and further reduce the effort which must be exerted to effect the rotation.

Although the adjustable cable suspension of the conveyor permits almost all sag to be eliminated from the conveyor, it cannot accommodate the misalignment of adjacent sections which may result from the fact that a tubular member rolled up from sheet metal rarely has parallel ends. Thus, two adjacent sections, rather than having a single longitudinal axis, have axes which form slightly less than a straight angle, and rotating two such sections may require that the angle be raised from below the horizontal to above it, unless the tube is free to flex at its joints as it is in the apparatus of the present invention.

Thus, it can be readily understood that what has been provided is a relatively simple conveyor construction, yet one which will fully achieve the objects of the invention. Various other modifications are contemplated and may obviously be resorted to by those skilled in the art without departing from the spirit and the scope of the invention as set forth in the appended claims.

We claim:

1. A device for conveying particulate material comprising: a support structure including a plurality of spaced standards; an elongated tubular member including a plurality of sections adapted to receive the flow of material therethrough, said sections having flanges connected with one another and having generally cylindrical portions; openings in said sections for discharging material therefrom; rotatable feed means extending through said sections; rotatable means suspended from said support structure standards; and flexible suspension means looped over the rotatable means and looped beneath said cylindrical portions at spaced points to provide the sole means to suspend the tubular member for free and ready rotation thereof in the support structure through 360° and to compensate for misalignment.

2. The device of claim 1 in which the rotatable means comprises a plurality of yokes, and sheaves journalled in said yokes.

3. The device of claim 1 in which the rotatable means comprises a plurality of substantially coplanar eyes, and a rod carried in said eyes.

4. The device of claim 1 wherein means are provided for adjusting the height of said rotatable means relative to said standards.

5. The device of claim 1 in which said sections each have flanges at both ends thereof; and wherein connective means join adjacent flanges at diametrically opposed positions, the connective means in successive pairs of flanges being positioned in planes at substantially right angles to one another to allow flexure between sections of said tubular member.

6. The device of claim 5 in which diametrically opposed slots are provided in each of said flanges, the slots in adjacent flanges being aligned; and wherein said connective means includes connective members impaling the diametrically opposed slots in each pair of adjacent flanges.

7. The device of claim 6 wherein said flanges extend radially outwardly of said tubular member, and circumferentially therearound.

References Cited by the Examiner

UNITED STATES PATENTS

| | | | |
|---|---|---|---|
| 2,251,738 | 8/1941 | Huntsinger | 248—60 |
| 2,542,172 | 2/1951 | Wold | 248—60 |
| 2,838,291 | 6/1958 | Peebles. | |
| 2,865,403 | 12/1958 | Le Vantine | 285—114 X |
| 2,867,314 | 1/1959 | Hansen | 119—52 X |
| 2,898,940 | 8/1959 | Cole | 285—114 X |
| 3,001,633 | 9/1961 | Heitshu | 198—64 |
| 3,029,791 | 4/1962 | Hacker | 119—52 |
| 3,037,611 | 6/1962 | Majorowicz | 119—52 X |
| 3,051,294 | 8/1962 | Reed | 119—52 X |
| 3,125,990 | 3/1964 | Van Peursem | 198—64 |

SAMUEL F. COLEMAN, *Primary Examiner.*

HUGH R. CHAMBLEE, *Examiner.*